: US 11,565,885 B2
(45) Date of Patent: Jan. 31, 2023

(12) United States Patent
Mesan et al.

(54) OSCILLATING CONVEYOR HAVING A CONTROL DEVICE

(71) Applicant: Afag Holding AG, Hergiswil (CH)

(72) Inventors: Izudin Mesan, Nuremberg (DE); Friedrich Durand, Rüttenen (CH); Klaus Bott, Altdorf (DE)

(73) Assignee: AFAG HOLDING AG, Hergiswil (CH)

( * ) Notice: Subject to any disclaimer, the term of this patent is extended or adjusted under 35 U.S.C. 154(b) by 0 days.

(21) Appl. No.: 17/462,704

(22) Filed: Aug. 31, 2021

(65) Prior Publication Data

US 2022/0073282 A1 Mar. 10, 2022

(30) Foreign Application Priority Data

Sep. 4, 2020 (DE) ...................... 10 2020 123 195.4

(51) Int. Cl.
*B65G 27/32* (2006.01)
*B65G 27/12* (2006.01)
(Continued)

(52) U.S. Cl.
CPC ............ *B65G 27/32* (2013.01); *B65G 27/12* (2013.01); *B65G 27/34* (2013.01); *B65G 43/10* (2013.01); *B65G 2203/042* (2013.01)

(58) Field of Classification Search
None
See application file for complete search history.

(56) References Cited

U.S. PATENT DOCUMENTS 3,917,050 A * 11/1975 Gregor ................... B65G 47/44
198/369.1
5,080,218 A * 1/1992 Izume ............... H02M 7/53803
198/762
(Continued)

FOREIGN PATENT DOCUMENTS

DE 29719684 U1 4/1998
DE 10005933 B4 8/2001
(Continued)

OTHER PUBLICATIONS

German Office Action dated May 4, 2021, DE 10 2020 123 195.4, 8 Pages.
(Continued)

*Primary Examiner* — Kavel Singh
(74) *Attorney, Agent, or Firm* — Lucas & Mercanti, LLP; Klaus P. Stoffel

(57) ABSTRACT

An oscillating conveyor having a conveying apparatus and a drive device that, upon actuation by a control device, excites an oscillation of the conveying apparatus with respect to a base of the oscillating conveyor to convey objects supported by a conveying surface of the conveying apparatus. The control device includes a communication interface for communication with an external communication device. The control device is designed so as, upon receiving a communication message including address and control information, to use the communication interface to check an addressing condition, the meeting of which is dependent on the address information, and only if the addressing condition is met to alter the actuation of the drive device based on the control information and/or to set an internal control parameter on which at least one chronologically subsequent actuation of the drive device by the control (Continued)

device is dependent to a value that is dependent on the control information.

15 Claims, 3 Drawing Sheets

(51) Int. Cl.
    *B65G 27/34*     (2006.01)
    *B65G 43/10*     (2006.01)

(56) References Cited

U.S. PATENT DOCUMENTS

| | | | | |
|---|---|---|---|---|
| 5,145,054 | A * | 9/1992 | Nelson | B06B 1/0261 |
| | | | | 198/524 |
| 5,883,478 | A * | 3/1999 | Thesling | H02P 25/032 |
| | | | | 318/128 |
| 6,308,822 | B1 * | 10/2001 | Moran | B65G 27/32 |
| | | | | 198/762 |
| 6,465,932 | B2 | 10/2002 | Yagi | |
| 6,471,040 | B1 * | 10/2002 | Baird | B65G 27/34 |
| | | | | 198/752.1 |
| 6,680,591 | B1 | 1/2004 | Knutson | |
| 7,228,957 | B1 | 6/2007 | Taylor | |
| 8,857,601 | B2 * | 10/2014 | Taylor | B65G 27/12 |
| | | | | 198/758 |
| 10,399,792 | B2 | 9/2019 | Henze | |
| 10,545,488 | B2 | 1/2020 | Henze | |
| 10,819,253 | B2 | 10/2020 | Schang | |
| 2003/0132086 | A1 | 7/2003 | Thompson | |
| 2007/0198100 | A1 | 8/2007 | Butters | |
| 2020/0277145 | A1 | 9/2020 | Combs | |

FOREIGN PATENT DOCUMENTS

| | | |
|---|---|---|
| DE | 60104371 T2 | 8/2005 |
| DE | 102006047431 A1 | 5/2007 |
| DE | 102006045020 B4 | 6/2007 |
| DE | 60312364 T2 | 11/2007 |
| EP | 2910502 A1 | 8/2015 |
| IT | 201900009351 A1 | 9/2019 |
| JP | S6175717 A | 4/1986 |
| JP | 2000097752 A | 4/2000 |
| WO | 2014085429 A1 | 6/2014 |
| WO | 2016169982 A1 | 10/2016 |
| WO | 2017211434 A1 | 12/2017 |

OTHER PUBLICATIONS

European Patent Office issued the Search Report dated Jan. 31, 2022 regarding parallel European Patent Application No. 21187917.6, 13 Pages.

* cited by examiner

OSCILLATING CONVEYOR HAVING A CONTROL DEVICE

CROSS-REFERENCE TO RELATED APPLICATIONS

The present application claims priority of DE 10 2020 123 195.4, filed Sep. 4, 2020, the priority of this application is hereby claimed, and this application is incorporated herein by reference.

BACKGROUND OF THE INVENTION

The invention relates to an oscillating conveyor having a conveying apparatus and a drive device that, upon an actuation of the drive device by a control device, excites an oscillation of the conveying apparatus with respect to a base of the oscillating conveyor in order to convey objects supported by a conveying surface of the conveying apparatus by means of this oscillation. In addition, the invention relates to an apparatus that comprises such an oscillating conveyor.

A standard approach to driving oscillating conveyors is to periodically attract a yoke attached to the conveying apparatus thereof, for example to an oscillating rail, by means of an electromagnet to which current is periodically supplied, in order to excite oscillations of the conveying apparatus for the purpose of transporting the supported objects. In order to be able to set the amplitude of the oscillation and sometimes also to allow an adjustment of the frequency of the oscillation, control devices are normally used that provide the voltage or the current for the electromagnet by means of phase gating control or pulse width modulation. Appropriate control devices can be arranged on machine frames or in switchgear cabinets, for example.

In many applications, an oscillating conveyor is not intended to be operated continuously, but rather only when specific sensor signals from an ultrasonic sensor or a light barrier are present or in specific intervals of time. For such applications, known control devices for oscillating conveyors have enable inputs that can be connected to a central controller, as a result of which the supply of current to the oscillating conveyor can be controlled by a central controller, for example a central process computer or a programmable logic controller (PLC), which is typically arranged in a switchgear cabinet. In this case, there can be provision for the control device to increase the amplitude of the coil current continuously over a certain time interval after an enabling has been provided by the central controller, in order to ensure controlled startup of the oscillating conveyor.

If a relatively large number of oscillating conveyors are intended to be used in more complex apparatuses, for example in order to move workpieces in different subsections of an automated production facility, the approach described leads to a high level of wiring complexity, since each oscillating conveyor needs to be connected to an associated control device by way of power lines, and these control devices for the individual oscillating conveyors subsequently need to be connected to a central process computer or a PLC in a star shape. Moreover, the individual sensor signals need to be routed to the control computer or the PLC. This also leads to the provision of additional sensors, for example temperature sensors or vibration sensors, on the individual oscillating conveyors, for example in order to identify a need for maintenance or other problems early, being possible only with considerable additional complexity in regard to the wiring of the individual oscillating conveyors.

Another disadvantage of the approach described is that the changing of parameters of the conveyors, in particular an oscillation amplitude and oscillation frequency reached after a startup, is typically possible only at the control device associated with the individual oscillating conveyor. This can significantly increase the complexity for optimum setting of an apparatus having multiple oscillating conveyors, and this can require all the control devices of the individual oscillating conveyors to be arranged in grouped fashion, which can increase the wiring complexity further. Synchronization of the oscillation phases of different oscillating conveyors, which can be useful for specific transportation tasks, is also possible only to a very limited extent using the outlined approach.

SUMMARY OF THE INVENTION

The invention is therefore based on the object of specifying a way of reducing the wiring complexity when using multiple oscillating conveyors and in this case of preferably improving the options for control and configuration of the individual oscillating conveyors further.

The object is achieved according to the invention by an oscillating conveyor of the type cited at the outset, wherein the control device is integrated in the base or mounted on the base and comprises at least one communication interface for communication with an external communication device, in particular with a communication device of another oscillating conveyor, wherein the control device is designed so as, upon receiving a communication message that comprises address information and control information, to use the communication interface to check an addressing condition, the meeting of which is dependent on the address information, and only if the addressing condition is met to alter the actuation of the drive device on the basis of the control information and/or to set an internal control parameter on which at least one chronologically subsequent actuation of the drive device by the control device is dependent to a value that is dependent on the control information.

The invention is based on the concept of incorporating individual intelligence for controlling the drive in the oscillating conveyor itself, that is to say providing an embedded solution. In this case, integration of an FPGA or a microcontroller or a "system on a chip" can preferably provide sufficient computation power for, in addition to actuation of the drive, a communication stack to be able to be implemented, which permits the respective control device and therefore the respective oscillating conveyor to be addressed within a network or a bus. This allows a departure from the star-shaped wiring discussed at the outset for controlling multiple oscillating conveyors by means of a central control device, and a suitable network topology, or a bus, can be used as required in order to control the individual oscillating conveyors. As will be explained in even more detail later, it is sometimes even possible to dispense with a central process computer or a central programmable logic controller in this case, and local control can be implemented by means of the controllers of the oscillating conveyors themselves.

The data transfer via the communication interface preferably takes place in digital form. This allows a single communication interface of the oscillating conveyor to be used to carry out different control tasks, for example to start or stop operation of the oscillating conveyor, that is to say to issue an enabling, and to adapt the amplitude, frequency and/or phase of the supply of current to the drive device or of the oscillation at the same time or by means of separate messages. Additionally, the communication interface can be used to transfer information or control instructions to other oscillating conveyors, a central process computer or a central PLC or to other devices within the same network or on the same bus. This can serve, by way of example, to provide sensor data from sensors integrated in the oscillating conveyor, or connected thereto, to other oscillating conveyors or a central control device. By way of example, measurement data from a temperature and/or vibration sensor can regularly be reported to a central control device, for example in order to identify whether maintenance on the oscillating conveyor is required.

The communication interface can in particular be used to connect to a serial bus or to a network, and the communication message can be a data packet transferred via the bus or the network, for example, the bits of which data packet are transferred serially. The communication interface can also allow a parallel communication, however. In this case the identification information can be transferred sequentially via the same lines as the control information or else via separate lines.

The addressing condition can check whether the address information or processing information ascertained therefrom matches a predefined value or one of multiple predefined values. It can be met only in the event of such a match. However, it is also possible for validity intervals to be specified for address information, and all the addresses within this validity interval can be taken into consideration, or the like. The address information can therefore in particular be used to address a single oscillating conveyor or else a group of oscillating conveyors or, generally, a group of devices connected in the network or to the bus.

The communication interface is in particular a wired interface that preferably satisfies high realtime demands. The interface used can be for example EtherCat (IEC 61158), Profinet, Profibus, IONet or the like. In principle, it would for example also be possible for other Ethernet protocols, for example a TCP/IP protocol, to be used. In applications in which there are lower realtime demands, it is also possible for wireless communication interfaces to be used, and a communication can take place for example via Bluetooth, WLAN, ZigBee, WiMAX or other radio connections. Alternatively, an infrared communication via IrDA can take place.

The conveying apparatus can in particular be an oscillating rail or a conveying pot. The conveying apparatus can be mounted on the base, in particular by way of springs, for example by way of leaf spring packets. The control device, on the other hand, can be mounted rigidly on the base or integrated therein, for example held in a recess or aperture in the base.

The drive device can in particular comprise a coil that, when supplied with current, attracts a yoke in order to set the conveying apparatus oscillating.

The control device can be an FPGA or can comprise an FPGA. The user-programmability of an FPGA can achieve the effect, depending on programming or configuration, for example that different bus or network protocols are supported on the communication interface, input data, for example captured sensor data, are evaluated differently, different actuation patterns for the drive are able to be implemented, and the like. The structure of an FPGA means that it is also particularly well suited to simultaneously carrying out multiple tasks, for example to simultaneous communication, drive control and sensor data capture.

Moreover, there are typically a relatively large number of inputs and outputs available via which digital data can be captured or output. Use of an FPGA additionally allows defined reaction times to be ensured even when multiple parallel tasks are carried out simultaneously, and therefore allows real-time demands to be satisfied robustly. Moreover, the required external circuit complexity can be reduced, since for example FPGAs also allow large parts of analog-to-digital converters or digital-to-analogue converters, in particular sigma-delta converters, to be produced by means of appropriate configuration or programming of the FPGA, and therefore appropriate functionalities to be provided using minimal external circuitry.

In particular actuation of the drive device, that is to say in particular supply of current to the coil, by means of PWM control can result in digital outputs of the FPGA indirectly or directly actuating transistors or other switches in order to control the supply of current to the coil.

As an alternative to the use of an FPGA, it would also be possible to use a microcontroller, a CPU or the like, for example. To meet the same demands, in particular with regard to realtime capability, this would typically require a higher power consumption or a higher level of implementation complexity, however.

The control device can comprise a processing device that implements a communication protocol for the communication with the external communication device via the communication interface, wherein the communication protocol is predefined by a configuration or a computer program, wherein the control device is designed to receive the configuration or the computer program via the communication interface or a programming interface and/or to read in said configuration or computer program from a removable data medium. In this instance, a configuration is in particular intended to be understood to mean the configuration of an FPGA, which is also referred to as programming of the FPGA.

The effect achieved by the approach described is in particular that changing the configuration or the computer program allows the communication protocol to be changed without replacing other components. Depending on connection conventions, it can certainly be useful or even necessary to replace sockets, plugs or the like that are used or to use adapters. However, this is substantially less complex than replacing the entire control device, that is to say for example replacing a circuit board that implements the control device. By way of example, replacing the configuration or the computer program therefore allows alternation between the use of EtherCat, Profinet or IONet.

Another application for a change of communication protocol would be for example an alternation between a UA XMI stack, which implements OPC-UA via SOAP, and an implementation via UA Binary, which uses the UA TCP protocol. Whereas the second variant allows a lower overhead, the first variant is easier to incorporate into existing networks, since for example the use of port 80 frequently means that no special configuration of a firewall is necessary. In general, the user-programmability of the processing device, at least in terms of the communication protocol, leads to the oscillating conveyor according to the invention being configurable for a multiplicity of different applications with very little complexity and e.g. even being able to be incorporated into existing automation networks.

When a new configuration or a new computer program is received via the communication interface, it can be buffer-stored in the control device, for example, and loaded when the control device is restarted, which can be done manually or automatically after applicable data have been received. It would also be possible for the processing device to be modularly programmable, so that for example reconfiguration of an FPGA in sections or replacement of executed program parts can be possible without restarting the control device. An advantage of receiving the configuration or the computer program via the communication interface is that an applicable change of configuration becomes possible without accessing the individual oscillating conveyor via the network or the bus, which is why a corresponding approach is useful in particular for updates for product support.

The use of a dedicated programming interface is expedient in particular if the configurations or the computer program are/is intended to be loaded during the actual manufacture of the oscillating conveyor or during the actual construction of a larger apparatus. Such programmability is frequently particularly easy to implement, since for example programming of FPGAs in other fields of application via the SPI bus is already customary. Alternatively, the programming interface used can be for example an $I^2C$ bus, or wireless programming, for example by means of near field communication, could take place.

The removable data medium used can in particular be a flash card, for example an SD card or a CF card. Removable data media can be installed in the housing interior and for example replaced only during maintenance or manufacture. Alternatively, the data medium can also be removable by the end customer, for example by virtue of there being provision for an externally accessible card slot on the oscillating conveyor. The removable data medium can be permanently installed in the oscillating conveyor, so that the applicable configuration or the applicable computer program is read in therefrom whenever the control device starts, for example. However, it is also possible for the configuration or the computer program to be copied to an internal memory of the oscillating conveyor, which means that the data medium can subsequently be removed again.

The processing device can be designed to take the configuration or the computer program as a basis for providing control signals for actuating the drive device. In particular, the processing device can be completely user-programmable, which means that changing the configuration or the computer program allows substantially any functionality to be implemented, so long as there are sufficient resources of the processing device available for the programmed or configured tasks.

The control signals can be output as digital signals that switch switches or transistors of a power stage, for example. Alternatively, it would be possible for the control signals output to be analog signals, for example in order to predefine a threshold value for phase gating control. The configuration or programming in particular influences the dependency of the control signals on received communication messages and/or on other captured data, for example on sensor data.

An appropriate configuration or programming allows the processing device to implement additional control tasks, similarly to how they have been able to be implemented by an external PLC to date. Particularly preferably, appropriate configuration or programming of the processing device allows said processing device itself to implement a PLC, however, which is configured by further received configuration data or configuration data that are set on the device. This allows for example a subsequent adaptation of the PLC implementation, for example in regard to the number or type of processed input signals, in regard to the reaction time achieved or in regard to the update rate for control signals, the interaction with another communication, etc. In particular, the configuration or programming of the processing device can implement a bridge between the implemented PLC and the communication via the communication interface, so that for example a PLC implemented by the control device of one oscillating conveyor can evaluate sensor data that have been received via the communication interface from another oscillating conveyor.

The oscillating conveyor can have at least one integrated sensor and/or at least one sensor connection for connecting an external sensor, wherein the control device is designed to capture sensor data from the integrated sensor and/or, via the respective sensor connection, sensor data from the external sensor and firstly to transfer the sensor data or communication data that are dependent on the sensor data to the external communication device via the communication interface and/or secondly to take the meeting of a transmission condition that is dependent on the sensor data as a basis for transmitting a communication message to the external communication device via the communication interface and/or controlling the drive device on the basis of the sensor data.

The sensor used can be a temperature sensor and/or an acceleration sensor, for example. These sensors can in particular be integrated in the oscillating conveyor. Additionally or alternatively, the sensor used can be a light barrier, an ultrasonic sensor or the like. Such sensors can in particular be used to detect the occupancy of the oscillating conveyor itself or of another part of an apparatus of which the oscillating conveyor is part by objects that are to be transported. This can be used for example to temporarily stop the operation of the oscillating conveyor when the oscillating conveyor is idling and/or to request the supply of further objects by upstream devices or by a central controller.

Sensors that are used can in particular supply digital signals, for example based on the 24 V standard. However, it is also possible for at least some of the sensors to provide analog values, for example variable voltages or currents, which can be converted into digital values by the control device.

The sensor data or the communication data can be transferred to a central control device, for example a central processor computer or a central PLC. This can be used for example to collect temperatures or vibrations of the individual oscillating conveyors for the purpose of estimating maintenance intervals or for the purpose of checking correct operation, or the like.

Particularly preferably, the sensor data or the communication data that are dependent thereon can be transferred to another oscillating conveyor, however. By way of example, a sensor, e.g. a light barrier, the data of which are relevant to the operation of the other oscillating conveyor may be at a relatively great distance from the other oscillating conveyor. On the basis of the proposed configuration of the oscillating conveyor, these sensors can be connected to any oscillating conveyor operated in the same communication network or on the same bus, and their sensor data can be transferred to the other oscillating conveyor via the network or the bus, which means that substantially simplified wiring can sometimes be achieved. Moreover, the proposed approach allows sensor data from a single sensor to be provided to multiple oscillating conveyors or to the control devices thereof with little complexity.

A communication message transmitted when the transmission condition is met can be for example a request to a preceding processing stage for the supply of further objects. If, for example on the basis of the output signal from a light barrier, it is detected that the oscillating conveyor is idling, even though there is a need for further objects to be conveyed by downstream processing stages, such a communication message can be transmitted e.g. to the immediately preceding processing or conveying stage, for example to another oscillating conveyor, or to a central controller. In the simplest case, this can lead to the receiving oscillating conveyor being activated. It is particularly advantageous, however, if a check is in turn performed there to determine whether there are actually objects to be conveyed, and if not then the request is in turn forwarded to a preceding processing or conveying stage. This allows local control of different components of an apparatus to be implemented.

The control device can process digital sensor data from 8 or 16 sensors, for example, or else from a different number of sensors. A chip that is separate from the processing device, for example from an FPGA, can be used in order to convert the relatively high voltages of the 24 V standard to voltages that are suitable for the processing device. An external chip of this kind can additionally implement a multiplexer, in order to be able to query a large number of sensors via a small number of inputs and outputs of the processing device.

The control device can be designed so as, if the addressing condition is met, firstly to predefine an amplitude and/or a frequency and/or a phase of an AC current supplied to the drive device and/or of an AC voltage output to the drive device on the basis of the control information and/or secondly to actuate the drive device to excite the oscillation of the conveying apparatus only if an enable condition dependent on the control information is met. In particular, the control information in this case can code different instructions according to need, in order to instruct the respectively addressed control device or the respectively addressed control devices to adapt the actuation of the drive device, that is to say in particular to adapt the amplitude, frequency or phase of the oscillation by means of the applicable supply of current or application of voltage, or to enable or stop the operation of the oscillating conveyor.

When the oscillating conveyor starts or stops as a result of an applicable communication message being received, as is customary for an enabling in the case of previous control devices of simpler design, a firmly predefined startup or shutdown behavior can be predefined, or such a startup or shutdown behavior can be adjustable on the device itself. By way of example, a fixed or adjustably predefined amplitude ramp can be taken after an enabling. Given sufficient bandwidth and realtime capability of the communication interface or of a bus or network connected thereto, appropriate amplitude ramps or similar parameters for starting up or slowing the oscillating conveyor can also be predefined by applicable communication messages, however.

In order to allow good interoperability between different oscillating conveyors or other devices on the same network or bus and to abstract specific implementation details, it can be advantageous here to implement a service-oriented architecture and to use a machine-readable semantic description for the communication in addition to the parameters. In particular, this can be accomplished by virtue of the control device implementing network-callable functions. In this case, it is advantageous to implement certain standard functions that can for example provide other devices in the network or on the bus with lists of available functions or settable parameters. In this case, it can in particular be advantageous to implement the OPC-UA standard, which requires the implementation of a group of network-callable standard functions by way of which other functionalities and parameters can be ascertained and communicated in automated fashion. This firstly reduces the complexity for developing an appropriate communication interface and can secondly improve the integration of the oscillating conveyor according to the invention with other devices, including devices from other manufacturers, if these also implement an appropriate communication standard.

The control device can be designed to provide at least one network-callable function to the external communication device via the communication interface and/or to call a network-callable function of the external communication device via the communication interface. In particular, the communication with external communication devices, that is to say for example with control devices of other oscillating conveyors, a central process computer or a central PLC and/or with other devices in the same network or on the same bus, for example with grippers, fans, heaters, etc., can take place exclusively via network-callable functions. This improves the interoperability of different devices, since implementation details of the different devices can be concealed from external communication partners as dictated by object orientation and at the same time semantic information regarding relevant parameters, control options, etc. can be provided to communication partners in automated fashion.

If the communication interface is used to provide exclusively network-callable functions, the control device or the oscillating conveyor acts exclusively as a server for the purposes of an OPC-UA implementation, for example. By calling network-callable functions of at least one external communication device, the control device or the oscillating conveyor can additionally or alternatively operate as a client. A simultaneous implementation of server and client functions is useful in particular if local control of conveying or production processes or the like is intended to take place.

Preferably, the oscillating conveyor has a connection for a hybrid cable, wherein the connection has firstly contacts for supplying power to the oscillating conveyor and secondly at least one contact of the communication interface or of one of the communication interfaces. By way of example, the connection can have four contacts of a communication interface, as are used for example in the case of customary Ethernet connections or networking architectures based thereon, such as for example EtherCat, and additionally two power contacts. This reduces the wiring complexity compared to when separate cables are used for supplying power and for communication. In particular, when a linear network topology or a bus comprising multiple oscillating conveyors or comprising at least one oscillating conveyor and other components is used, it is possible to achieve the effect that two of the connected devices or oscillating conveyors in each case need to be connected to one another via just a single cable in order to achieve both communication between the different devices and a supply of power.

Alternatively, it would also be possible to use hybrid cables, the ends of which have separate connections for power and communication contacts. In principle, it is also possible to modulate communication signals onto powerlines. This approach is used for EtherCat-P, for example, and in various powerline communication or PowerLAN standards. In this case, however, the communication can sometimes be impaired by perturbations in the power grid, for example by the switching of large loads such as compressors, the use of phase gating controllers or the like.

The oscillating conveyor can have another connection for connecting to another component, in particular to another oscillating conveyor, wherein the other connection comprises contacts for a supply of power to the other component and at least one other contact, wherein the other contact loops through the contact of the communication interface of the connection or is a contact of another of the communication interfaces. This allows a bus topology when the contact of the communication interface is looped through, or a linear or ring topology when the other communication interface is used in conjunction with forwarding of communication messages, with little wiring complexity. The contacts for a supply of power to the other component can loop through the contacts of the other connection for supplying power to the oscillating conveyor itself. However, interposed units can also be used, for example in order to de-energize the other connection when it is unoccupied, to stabilize the power supply or the like.

The conveying apparatus can be supported on the base by way of springs, wherein the control device is rigidly connected to the base. In particular, the conveying apparatus can be supported on the base by way of at least one pair of leaf spring packets spaced apart in the direction of oscillation. In this case, the control device can in particular be arranged between the leaf spring packets of a pair. By way of example, the control device can have a separate housing that is inserted into a lateral recess in the base and screwed or riveted to said base or otherwise attached to said base. The aforementioned connections for connecting hybrid cables or alternatively e.g. separate connections for the at least one communication interface and the supply of power can be mounted on a lateral side surface of the base. However, they can also be mounted on the base at one or both ends in the direction of oscillation.

As an alternative to the arrangement of the control device inside the base or between leaf spring packets, the control device can also be attached to the base at the side, in particular in a separate housing, and can therefore extend the base perpendicularly with respect to the direction of oscillation, or can be mounted on or placed on an end face of the base in the region of one of the ends in the direction of oscillation.

The control device or a printed circuit board implementing said control device does not necessarily have to have a separate housing, but can alternatively also be accommodated in a cavity, at least part of which is bounded by the base itself. By way of example, such a printed circuit board can be clamped between two subcomponents of the base.

The connection for the at least one hybrid cable or for the at least one communication interface and the supply of power and also optionally at least one sensor connection for connecting an external sensor can be mounted on the base itself or on a cover plate that seals a recess in the base that accommodates the control device. If the control device has a separate housing, they can also be arranged on this housing. All the available connections can be mounted on one side of the base laterally or at one end in the direction of oscillation. However, it can be particularly advantageous to mount one of the connections for hybrid cables in each case at a respective end of the base in the direction of oscillation.

The drive device can be formed by an electromagnet and a yoke, wherein the yoke is mounted on the conveying apparatus or is formed by said conveying apparatus and the electromagnet is mounted on a countermass supported so as to be able to oscillate with respect to the base, or vice versa. By way of example, both the conveying apparatus and the countermass can be supported on the base by way of leaf spring packets. The arrangement described leads to an oscillation of the conveying apparatus and of the countermass being excited in opposite directions with respect to the base as a result of the electromagnet being supplied with current variably over time, and so the center of gravity of the oscillating conveyor remains substantially unchanged and therefore oscillations of the base are at least significantly reduced in their amplitude compared to oscillating conveyors that have no corresponding countermasses. As a result, when a control device is attached to the base rigidly or in an only slightly damping manner, considerably fewer vibrations are coupled into said base, as a result of which the loadings on the components of the control device and in particular on the connections of the components, that is to say for example solder joints, can be significantly reduced. Without the use of an applicable counterweight, the complexity for using a control device that is integrated in the base or mounted on said base would be increased considerably, since said control device would need to be designed to be significantly more robust in order to be able to withstand applicable vibrations.

The oscillating conveyor or the control device can have operator control elements and/or a display in order to allow the oscillating conveyor or the control device to be configured and/or system parameters to be read. By way of example, this can be used to predefine an address for the oscillating conveyor or the control device, which is compared with the address information for the purposes of the addressing condition. Moreover, for example limits can be defined for amplitudes and/or frequencies, a PLC implemented by the control device can be configured, amplitude ramps for starting or stopping the oscillating conveyor can be defined, or the like. It may suffice in this case to provide a relatively small display, for example a segment display with one or a few lines, and a few pushbutton switches.

A disadvantage of the approach described is that additional implementation complexity is required for providing operator control elements or the display, even though use thereof is only rarely necessary. Moreover, applicable operating elements and displays are sometimes difficult to access after the oscillating conveyor is integrated in a larger apparatus. In principle, applicable operating elements or a display could therefore be dispensed with, and the communication interface could be used for a configuration or status query instead. Should for example an address evaluated for the purposes of the addressing condition be adapted in this instance, however, it would typically be necessary in this case to disconnect the oscillating conveyor from a bus or network, which can be complex in complex apparatuses.

The aforementioned disadvantages can be avoided if the control device comprises a near field communication interface and is designed to use a near field communication interface to provide data stored in the control device to an external mobile device and/or to receive configuration data from the mobile device, on which configuration data the further operation of the oscillating conveyor is dependent. The mobile device can be a smartphone or a tablet, for example, or else a dedicated piece of hardware provided specifically for this purpose. If the intention is to use a smartphone or a tablet, this can execute a specific app implementing an applicable functionality. Alternatively, the control device could implement a web server, for example, and applicable operator control processes could therefore take place via a web interface and therefore via a standard browser.

The use of near field communication, on account of the very short ranges that are achieved therewith, allows precisely one oscillating conveyor, or precisely the control device thereof, to be addressed even without explicit addressing of an individual oscillating conveyor, or an individual control device. Alternatively, wired communication, for example via a USB port of the control device, would also be possible. In principle, it would also be possible to use a wireless communication with a greater range, for example via WLAN, Bluetooth®, IrDA or the like. In order to ensure robust addressing of an individual oscillating conveyor or an individual control device in this case, for example a fixed identifier of this oscillating conveyor can be read in optically using a barcode or a QR code.

The mobile device can be used for example to predefine an address of the oscillating conveyor that is evaluated for the purposes of the addressing condition. Additionally or alternatively, the configuration or the computer program can be loaded in order to implement or change the communication protocol used on the communication interface, or to define the actuation of the drive device, as has already been explained above. Additionally or alternatively, arbitrary internal parameters, for example startup times after an enabling, maximum amplitudes, frequency ranges or the like, can be set using the mobile device.

Moreover, the mobile device can be used to read internal parameters, for example meters indicating hours of operation, for example in order to diagnose whether a change of oscillating conveyor or of individual components is useful. Moreover, diagnostic data can also be provided, for example temperature characteristics, measured vibration amplitudes and the like. Since applicable mobile devices frequently have a sufficiently large display in order to allow comfortable reading, it is also possible, for example, for the control device to store datasheets, operating instructions or the like for the oscillating conveyor, which are able to be provided to the external mobile devices via the near field communication interface or the aforementioned alternatives, so that applicable information for a user can be provided by the oscillating conveyor itself.

Besides the oscillating conveyor according to the invention, the invention relates to an apparatus comprising a first oscillating conveyor according to the invention and a second oscillating conveyor according to the invention, the control device of which, as the external communication device, uses the communication interface to communicate with the control device of the first oscillating conveyor. This can serve for example to implement local control in which the first oscillating conveyor transfers instructions to the second oscillating conveyor and/or vice versa. Additionally or alternatively, sensor data can be interchanged between the first and second oscillating conveyors, for example, or the other advantages explained above for communication between oscillating conveyors can be achieved.

The communication connection of the first and second oscillating conveyors via their respective communication interfaces can form a section of a bus or of a network with linear topology or ring topology. As already explained above, the aforementioned topologies result in particularly low wiring complexity, with communication between all the subscribers of the bus or of the network still being able to be possible.

The control device of the first oscillating conveyor can be designed to ascertain control information for the second oscillating conveyor or another oscillating conveyor connected to the bus or the network and to use the communication interface to transmit a communication message that comprises said control information and is addressed to the second or the other oscillating conveyor. This can be useful in order to implement local control within the apparatus. By way of example, an oscillating conveyor can use sensor data, for example can use data from a light barrier, to detect that objects are queueing in the conveying section and to instruct at least one upstream oscillating conveyor to stop conveying until the queuing objects are transported away. Conversely, the oscillating conveyor itself or a downstream device can detect that transportation or processing capacities are free and additional objects need to be conveyed. In that case, the oscillating conveyor can transfer to the next oscillating conveyor upstream in the conveying chain, or to another applicable device, the instruction to provide objects. This oscillating conveyor or this device can then use sensor data to establish whether they themselves can provide objects or whether an applicable instruction to provide should be transferred to other upstream devices.

An advantage of the examples outlined, or generally of local or central control of the oscillating conveyors by way of appropriate communication messages, is that the addressing of individual oscillating conveyors or of groups of oscillating conveyors by means of the address information also allows targeted actuation of oscillating conveyors, or querying of data therefrom, that are not directly connected to the controlling or querying device. This is significantly different from the star-shaped connection of the individual oscillating conveyors to a central controller that is customary in the prior art.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
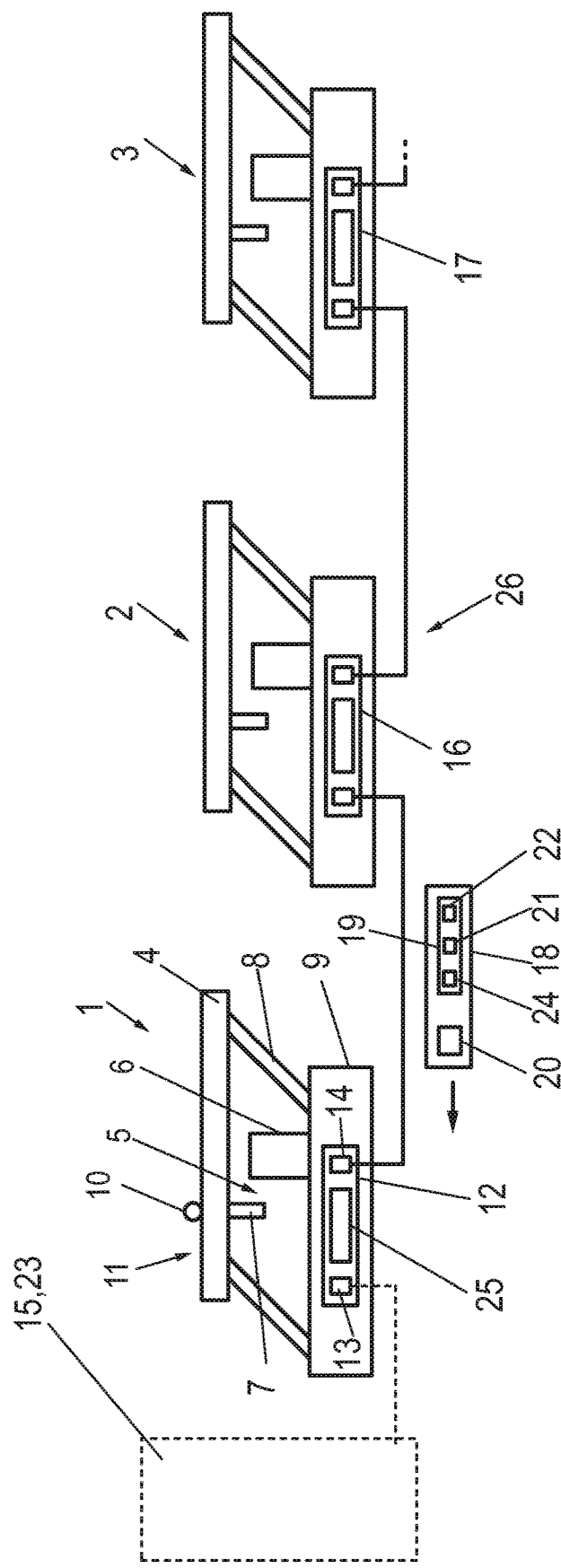
FIG. 1 shows an exemplary embodiment of an apparatus according to the invention comprising multiple exemplary embodiments of oscillating conveyors according to the invention.

FIG. 1 shows an apparatus, for example a conveying section or part of a production line, that comprises multiple oscillating conveyors 1, 2, 3 and optionally a central control device 23. The oscillating conveyors 1, 2, 3 each have a conveying apparatus 4, in the example a conveying rail, and a drive device 5, which is formed by an electromagnet 6 and a yoke 7 in the example. The conveying apparatus 4 is supported on a base 9 by way of springs 8, in particular leaf springs, which means that actuation of the drive device 5 by a control device 12, in particular by means of the periodic supply of current to the electromagnet 6 by the control device 12, can excite the conveying apparatus 4 to produce oscillations with respect to the base 9, in order to convey an object 10 supported by the conveying apparatus 4 in a conveying direction, that is to say in the horizontal direction in FIG. 1.

For reasons of clarity, FIG. 1 depicts the various oscillating conveyors 1, 2, 3 at a distance from one another, and no other components of the apparatus are shown that can transport objects 10 between the conveying surfaces 11 of the conveying apparatuses 4 of the oscillating conveyors 1, 2, 3, for example slides, gripper arms or the like. A typical application for the oscillating conveyor described, however, will be that the object 10 crosses the conveying surfaces 11 of all the oscillating conveyors 1, 2, 3 or of at least parts of the oscillating conveyors 1, 2, 3 in the course of transportation or processing.

In order to keep down the installation and wiring complexity for the respective oscillating conveyor 1, 2, 3, the respective control device 12 is integrated in the base 9 of the respective oscillating conveyor 1, 2, 3 or is mounted on said base. The respective oscillating conveyor 1, 2, 3 therefore forms an embedded device with integrated intelligence, which is provided by the control device 12. In principle, it would be possible to use relatively simple control devices 12 that constantly drive the respective conveying apparatus 4 to produce oscillations having a fixed amplitude or an amplitude that can be set on the device itself, so long as an applicable enabling from the central control device 23 is present, wherein appropriate enabling signals would need to be routed from the central control device 23 to the respective control devices 12 in star-shaped fashion. Since such star-shaped supply of enable signals firstly leads to a high level of wiring complexity, however, in particular when a relatively large number of oscillating conveyors 1, 2, 3 are used in the apparatus, and secondly, for many purposes, more flexible control is desired by means of which oscillating frequencies or amplitudes can also be adapted, for example, a different control approach is used in the apparatus depicted in FIG. 1.

In this case, the control devices 12 each have at least one communication interface 13, 14, in the example two communication interfaces 13, 14, by way of which they communicate with external communication devices 15, 16, 17. The communication device 15 is the central control device 23, while the communication devices 16, 17 are the control devices 12 of the other oscillating conveyors 2, 3.

In order to allow one of the oscillating conveyors 1, 2, 3 to be specifically addressed by the central control device 23 or the control device 12 of another of the oscillating conveyors 1, 2, 3, for example in order to enable or interrupt its operation, the control device 12 or a processing device 19 of the control device 12, for example an FPGA, is designed to respond to reception of a communication message 18 by way of the respective communication interface 13, 14, which comprises address information 20 and control information 21, by first checking whether an addressing condition is met, the meeting of which is dependent on the address information 20. In the simplest case, the respective control device 12 and therefore the respective oscillating conveyor 1, 2, 3 can have an allocated address, and the address information is compared with this address, the addressing condition being met only if the address information corresponds to the address. This allows individual addressing of the oscillating conveyors 1, 2, 3 or of their control devices 12.

In some cases, however, it may also be desired to actuate oscillating conveyors 1, 2, 3 in groups, so that it is also possible for multiple oscillating conveyors to have the same allocated address or for a single oscillating conveyor to have multiple allocated addresses, for example one of which allows exclusive addressing of this oscillating conveyor and another of which allows addressing of a group of oscillating conveyors that comprises this oscillating conveyor. If the addressing condition is not met, the applicable communication message can be rejected or, if the communication does not take place via a bus using a common medium, that is to say if contacts of the communication interfaces 13, 14 are not looped through, can be forwarded to the other of the communication interfaces 13, 14 in order to allow addressing of devices situated downstream of the respective oscillating conveyor 1, 2, 3 in the communication chain.

FIG. 1 schematically depicts a communication message 18 that travels from the oscillating conveyor 2 to the oscillating conveyor 1. If it is assumed that a linear topology with the aforementioned forwarding of communication messages is implemented in FIG. 1, this communication message could come from the oscillating conveyor 2 or have been forwarded by said oscillating conveyor, since for example it comes from the oscillating conveyor 3 or another oscillating conveyor, which is not depicted, or another device that has transmitted it to the oscillating conveyor 2 via the oscillating conveyor 3. The addressing condition might not be met, for example, because the communication message 18 could be addressed to the external communication device 15, that is to say the central control device 23.

If the communication message 18 is a communication message 18 whose address information 20 meets the addressing condition, however, then the control information 19 transmitted as part of the communication message 18 is taken into consideration by the processing device 25 of the control device 12 for the future actuation of the drive device 5. In this case, depending on the content of the control information 19 and the present operating state of the respective receiving oscillating conveyor 1, 2, 3, the present actuation of the drive device 5 can be directly altered by the control device 12, or an internal control parameter on which at least one chronologically subsequent actuation of the drive device 5 by the control device 12 is dependent can be altered by setting it to a value that is dependent on the control information 19.

The control information 19 can relate to an enabling of the operation of the respective oscillating conveyor 1, 2, 3, for example, that is to say can in particular indicate whether or not operation of the respective oscillating conveyor 1, 2, 3 is supposed to take place. If the desired state matches the actual state, the actuation does not change. Otherwise, the oscillating conveyor can be started, with in particular the amplitude of a voltage that is output by the control device 12 or of the output current being able to be continuously increased in order to allow uniform startup. Conversely, reception of suitable control information can also lead to the operation of the oscillating conveyor being temporarily interrupted.

Received control information 19 can also be used to adapt an amplitude, frequency and/or phase of an AC voltage that is output to the drive device 5; if such a parameter change is received while the respective oscillating conveyor 1, 2, 3 is not operated, and if this control information 19 does not simultaneously trigger operation of the oscillating conveyor 1, 2, 3, this initially leads to a change in the internal control parameter that is taken into consideration for the subsequent actuation.

In order to achieve good interoperability between different apparatuses, which can also come from different manufacturers, within the network 26 formed by way of the communication interfaces 13, 14, it can be advantageous to use communication messages 18 based on the OPC-UA standard or, expressed in general terms, to use network-callable functions, in order to control the individual oscillating conveyors 1, 2, 3 or to adapt and/or to read internal parameters. In this case, the individual oscillating conveyors 1, 2, 3 or the central control device 23 act as objects as stipulated by the object-oriented programming, which have internal variables and implement functions that can be called by other devices.

In this case, the address information 20 can be regarded as the selection of that object or that device whose function is supposed to be called. The control information 19 in this case can comprise a function selection 24 of the function to be called and parameters 21, 22 of this function, for example. If for example the function selection 24 selects a function for setting an internal control parameter, the control parameter to be set can be chosen by the parameter 21, that is to say for example it can be stipulated whether an amplitude, a frequency or a phase is supposed to be predefined. The parameter 22 can then predefine the desired value for the control parameter. A different value of the function selection 24 could result for example in a request being made for measured variables, for example from sensors installed or connected in the respective oscillating conveyor 1, 2, 3, the parameters 21, 22 being able to indicate which sensor is supposed to be read, for example.

The use of the central control device 23 in FIG. 1 is optional. In some applications, it can admittedly be advantageous to use a central control device of this kind. Since the control devices 12 of the individual oscillating conveyors 1, 2, 3 can already carry out complex control tasks and, by interchanging communication messages 18, can also request data from control devices 12 of respective other oscillating conveyors 1, 2, 3 or can control these oscillating conveyors 1, 2, 3, however, local control can also be implemented. Approaches for implementing local controls of this kind have already been explained in the general part of the description.

Figure 2:
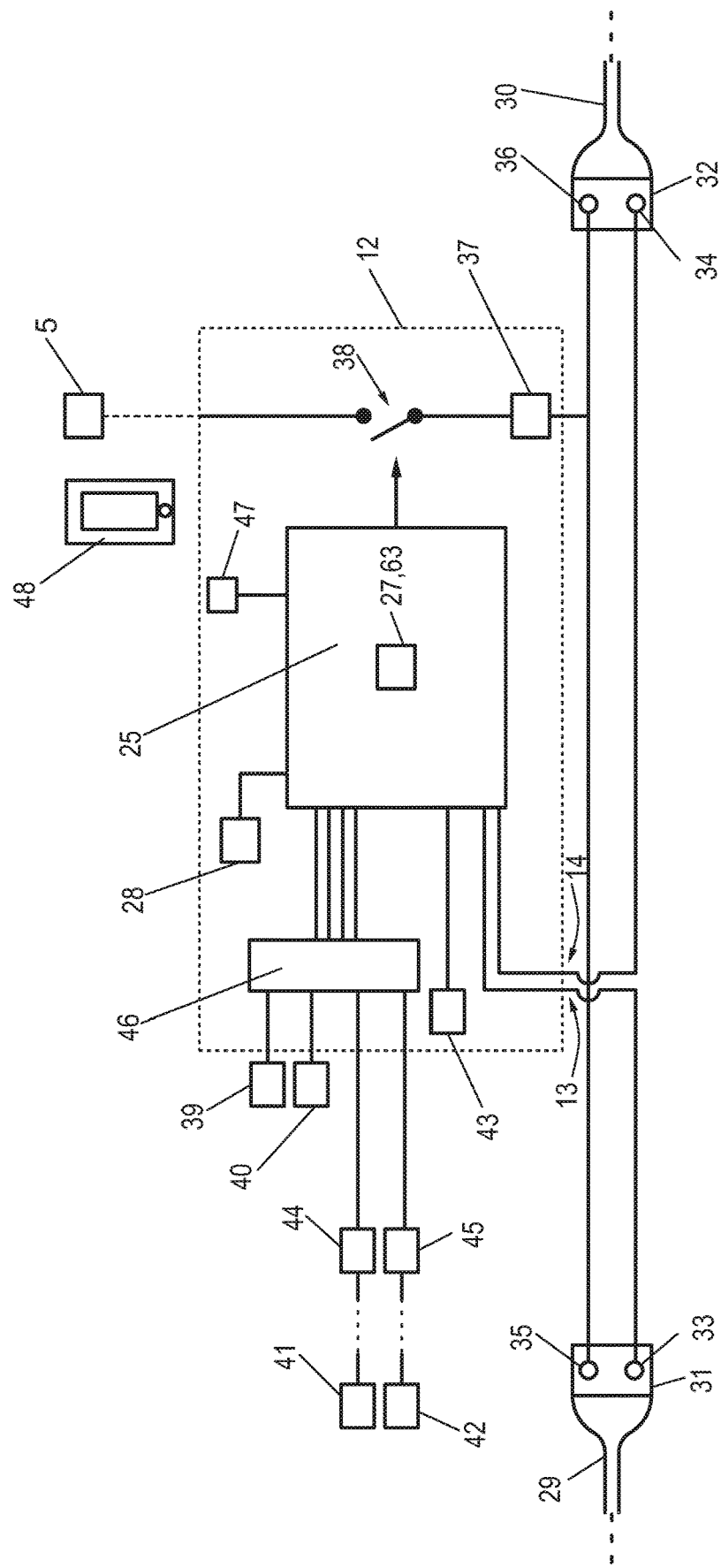
FIG. 2 shows the design of the control device of an exemplary embodiment of the oscillating conveyor according to the invention.

Further details relating to the implementation and operation of the control device 12 and relating to the communication between the oscillating conveyors 1, 2, 3 will be explained below with reference to FIG. 2. In order to implement the network 26 schematically depicted in FIG. 1 with a linear topology and at the same time a supply of power to the oscillating conveyors 1, 2, 3 with minimum complexity, each of the oscillating conveyors 1, 2, 3 has two connections 31, 32 for a respective hybrid cable 29, 30 connecting the respective oscillating conveyor 1, 2, 3 to the device that is adjacent in the network 26, in particular to another of the oscillating conveyors 1, 2, 3. The hybrid cables comprise both power lines and communication lines. By way of example, there can be provision for four communication lines for Ethernet communication and two lines for supplying power. For reasons of clarity, only one contact 33, 34 for the respective communication interface 13, 14 and one contact 35, 36 for the power supply are schematically depicted for the respective connection 31, 32 in FIG. 2.

The supply of current to the drive device 5 is controlled in the exemplary embodiment shown by virtue of the current provided via the contacts 35, 36 being supplied, following a rectification 37, to a switching means 38, for example a transistor, which is controlled by the processing device 25 of the control device 12 in order to realize PWM-based voltage provision for the drive device 5. On account of the impedance of the electromagnet 6 or the use of a filter circuit, which is not shown, setting the pulse width of the modulation allows a voltage that is currently output to the drive device 5 to be set, and variation of the pulse width over time ultimately allows any voltage or current waveform over time to be output to the drive device 5.

The processing device 25 is formed by an FPGA in the example and is therefore user-programmable. The control of the drive device 5, in particular the dependency of this control on received communication messages 18 or sensor data from connected sensors 39 to 42, can therefore be predefined by a suitable configuration 27 of the FPGA, which can also be regarded as programming. The configuration 27 can be read from an internal memory 28, for example from a flash memory, when the control device 12 starts, for example, or may be stored in the processing device 25 itself. Alternatively, it would be possible, for example, for the processing device 25 to be implemented by a microcontroller or the like. In that case, instead of the configuration 27 of the FPGA, it would be possible to use a computer program 63 that predefines the behavior of the processing device 25.

Besides the adaptability of the actuation of the drive device 5, the user-programmability of the processing device 25 is advantageous because changing the configuration 27 or the computer program 63 also allows a communication protocol that is used to communicate with the external communication devices 15, 16, 17 via the communication interfaces 13, 14 to be altered. Insofar as different communication protocols are therefore electrically compatible with one another, solely reprogramming the processing device 25 allows need-based selection of which communication protocol the control device 12 or the respective oscillating conveyor uses to communicate with other devices, which significantly simplifies incorporation of the oscillating conveyor 1, 2, 3 into existing networks.

It is possible, in principle, for the configuration 27 or the computer program 63 to be changed by transmitting an appropriate communication message 18 via the communication interface 13, 14. In many applications, however, it is advantageous to load the configuration 27 or the computer program 63 into the control device 12 via a dedicated programming interface 43, for example an SPI bus.

As already mentioned above, the processing device 25 can be used to capture sensor data from multiple sensors 39 to 42. In this case, for example the sensors 39 and 40 can be temperature and vibration sensors integrated in the respective oscillating conveyor 1, 2, 3. The sensors 41, 42 can be external sensors connected to a respective sensor connection 44, 45 of the oscillating conveyor 1, 2, 3. If the sensors 39 to 42 provide digital data directly, they could, in principle, be directly connected to connections of the processing device 25, that is to say in particular of an FPGA. To protect the processing device 25, or for the purpose of voltage conversion, for example if sensors based on the 24 V standard are used, a chip 46 can be connected for conversion between the processing device 25 and the sensors 39, 40 or the sensor connections 44, 45, however. Alternatively, a corresponding chip 46 could also carry out an analog-to-digital conversion in order to be able to process analog sensor signals too.

The sensor data from the sensors 39 to 42 can firstly be processed in the control device 12 itself in order to operate the drive devices 5 in the respective oscillating conveyor 1, 2, 3. However, it is also possible for sensor data or communication data dependent on the sensor data to be transferred to at least one of the external communication devices 15 to 17 via at least one of the communication interfaces 13, 14, this being able to be used, by way of example, to connect sensors that are located at a relatively great distance from the oscillating conveyor 1, 2, 3 to whose operation they are particularly relevant to an instance of the oscillating conveyors 1, 2, 3 that is located closer and to transfer the data from there via the network 26.

In some cases, there may be a desire to make adjustments for the individual control device 12 or the individual oscillating conveyors 1, 2, 3 locally on the device itself without this needing to take place via the network 26. By way of example, this can be useful in order to change the address of the respective oscillating conveyor 1, 2, 3, which address is evaluated for the purposes of the addressing condition. At the same time, there may be a desire to read directly determined parameters that can indicate wear, for example a temporal trend in temperature or vibration values, from the control device 12. Applicable configuration or read processes could be performed by way of a display mounted on the respective oscillating conveyor 1, 2, 3, and associated operator control elements. Since these are functions that are used relatively rarely, however, very simple displays and operator control elements would be able to be implemented in an economically viable manner should the need arise, but these do not allow convenient operation.

The control device 12 therefore uses a near field communication interface 47, which can communicate with an external mobile device 48, in the example with a smartphone having an appropriate installed app, over short distances, for example a few centimeters or a few tens of centimeters, in order to be able to make appropriate settings, or to be able to read data, using the mobile device 48. Since a relatively large display is therefore available and a convenient display of information is possible, a manual for the oscillating conveyor 1, 2, 3 or the control device 12 may also be stored in the memory 28, for example, said manual being able to be provided to a user via the mobile device as required.

Figure 3:
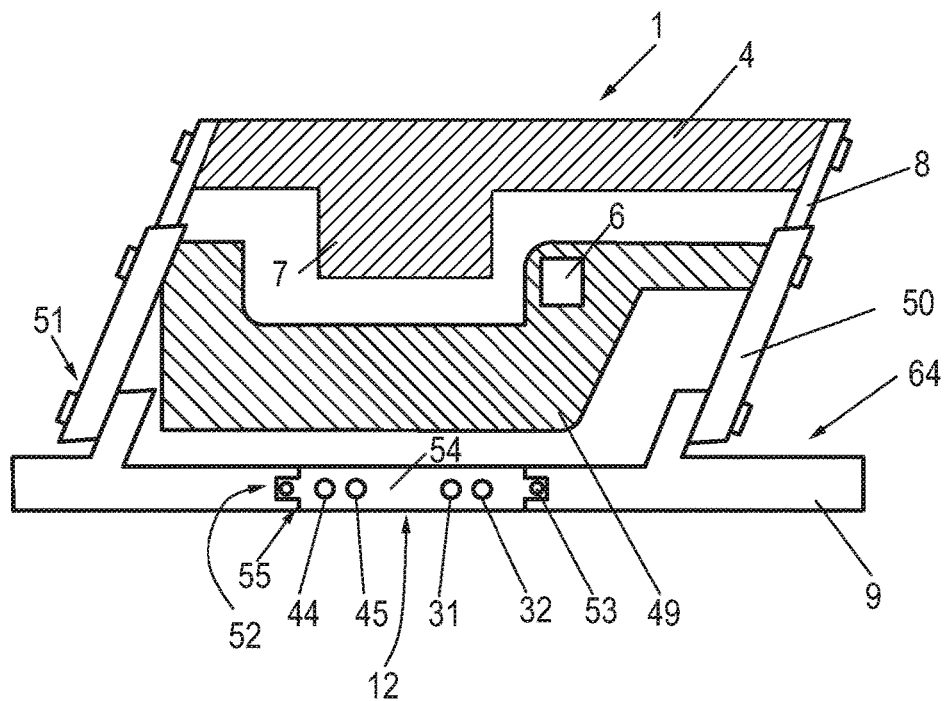
FIG. 3 shows another exemplary embodiment of an oscillating conveyor according to the invention.

For reasons of clarity, FIG. 1 depicts a relatively simple design for the oscillating conveyors 1, 2, 3, which would lead to there being quite a strong input of oscillations into the base 9, however, resulting in high demands on the robustness of the control device 12. In particular, solder joints can be subjected to high load in this case by relatively heavy components on printed circuit boards. A way of reducing or even largely completely avoiding applicable vibrational loads for the control device 12 is depicted in FIG. 3. The oscillating conveyor 1 depicted there uses, in a similar manner to the oscillating conveyors 1 to 3 depicted in FIG. 1, an electromagnet 6 in order to attract a yoke 7 of the conveying apparatus 4. In contrast to the electromagnet 6 being installed on the base 9 directly, as depicted in FIG. 1, however, the electromagnet 6 in FIG. 3 is mounted on a counterweight 49 that is attached to the base 9 by way of another pair of springs 50, in particular leaf springs. A periodic supply of current to the electromagnet 6 therefore results in an antiphase oscillation of the conveying apparatus 4 and the counterweight 49, as a result of which the forces transferred to the base 9 via the springs 8, 50 at the respective attachment point 51 largely compensate for one another and there is therefore only a very small resultant input of vibration into the base 9.

FIG. 3 also shows a specific way of integrating the control device 12 into the base 9. In this case, the base 9 has, in the region between the springs 8, 50, a recess 55 into which the control device 12 arranged in a separate housing is introduced, after which it can be screwed to the base 9 by way of tabs 53. The connections 31, 32 for the hybrid cables 29, 30 and the sensor connections 44, 45 are mounted on a housing wall 54 of the housing of the control device 12.

Instead of using such a recess 55, the housing of the control device 12 could also be mounted on external surfaces of the base 9, for example on the lateral external surface 52 or on an upper external surface 64. The shape of the housing can be chosen according to need in order to arrive at an oscillating conveyor 1 of compact design.

Figure 4:
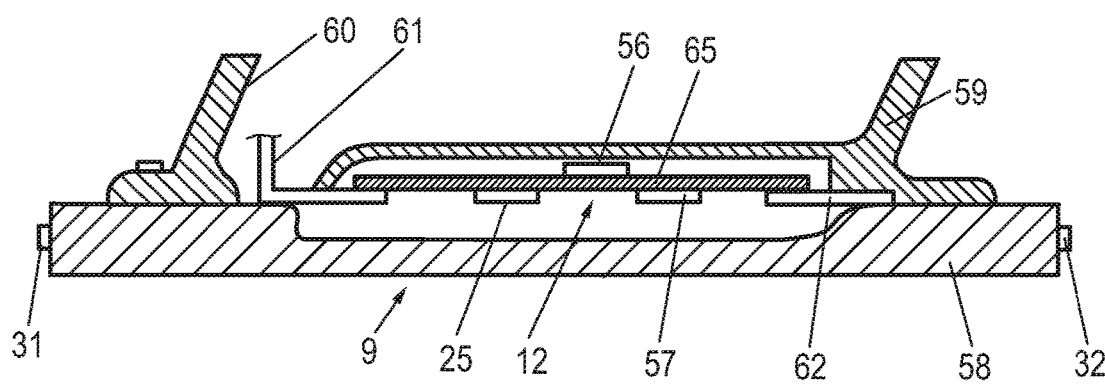
FIG. 4 shows a detail view of the base of another exemplary embodiment of the oscillating conveyor according to the invention.

Another way of integrating the control device 12 into a base 9 of an oscillating conveyor 1, 2, 3 is depicted schematically in FIG. 4. For reasons of clarity, only the base 9 is depicted in this case, said base being formed by three components 58, 59, 60 in the example shown. The control device 12 is formed by a printed circuit board 65 that bears the processing device 25 and other components 56, 57, which are depicted only schematically. The connecting clips 61, 62 are firstly attached to the printed circuit board 65, for example bonded and/or welded there, and are secondly clamped by the components 58, 59 of the base 9. At least the conductor clip 61 is insulated from the components 58, 59, and several of these conductor clips 61 can be used in order to route connections for supplying current to the electric motor 6 and for connecting the sensors 39, 40 through the interspace between the components 58, 59. The connections 31, 32 for connecting the hybrid cables 29, 30 can be arranged on the end faces of the base 9 in the direction of oscillation, for example.

While specific embodiments of the invention have been shown and described in detail to illustrate the inventive principles, it will be understood that the invention may be embodied otherwise without departing from such principles.

We claim:

1. Oscillating conveyor having a conveying apparatus and a drive device that, upon an actuation of the drive device by a control device, excites an oscillation of the conveying apparatus with respect to a base of the oscillating conveyor in order to convey objects supported by a conveying surface of the conveying apparatus by means of this oscillation, wherein the control device is integrated in the base or mounted on the base and comprises at least one communication interface for communication with an external communication device, in particular with a communication device of another oscillating conveyor, wherein the control device is designed so as, upon receiving a communication message that comprises address information and control information, to use the communication interface to check an addressing condition, the meeting of which is dependent on the address information, and only if the addressing condition is met to alter the actuation of the drive device on the basis of the control information and/or to set an internal control parameter on which at least one chronologically subsequent actuation of the drive device by the control device is dependent to a value that is dependent on the control information, wherein the control device is designed to provide at least one network-callable function to the external communication device via the communication interface so that the OPC-UA standard is implemented.

2. The oscillating conveyor according to claim 1, wherein the control device is an FPGA or comprises an FPGA.

3. The oscillating conveyor according to claim 1, wherein the control device comprises a processing device that implements a communication protocol for the communication with the external communication device via the communication interface, wherein the communication protocol is predefined by a configuration or a computer program, wherein the control device is designed to receive the configuration or the computer program via the communication interface or a programming interface and/or to read in said configuration or computer program from a removable data medium.

4. The oscillating conveyor according to claim 3, wherein the processing device is designed to take the configuration or the computer program as a basis for providing control signals for actuating the drive device.

5. The oscillating conveyor according to claim 1, wherein the oscillating conveyor has at least one integrated sensor and/or at least one sensor connection for connecting an external sensor, wherein the control device is designed to capture sensor data from the integrated sensor and/or, via the respective sensor connection, sensor data from the external sensor and firstly to transfer the sensor data or communication data that are dependent on the sensor data to the external communication device via the communication interface and/or secondly to take the meeting of a transmission condition that is dependent on the sensor data as a basis for transmitting a communication message to the external communication device via the communication interface and/or controlling the drive device on the basis of the sensor data.

6. The oscillating conveyor according to claim 1, wherein the control device is designed so as, if the addressing condition is met, firstly to predefine an amplitude and/or a frequency and/or a phase of an AC current supplied to the drive device and/or of an AC voltage output to the drive device on the basis of the control information and/or secondly to actuate the drive device to excite the oscillation of the conveying apparatus only if an enable condition dependent on the control information is met.

7. The oscillating conveyor according to claim 1, wherein the control device is designed to call a network-callable function of the external communication device via the communication interface.

8. The oscillating conveyor according to claim 1, wherein it has a connection for a hybrid cable, wherein the connection has firstly contacts for supplying power to the oscillating conveyor and secondly at least one contact of the communication interface or of one of the communication interfaces.

9. The oscillating conveyor according to claim 8, wherein it has another connection for connecting to another component, in particular to another oscillating conveyor, wherein the other connection comprises contacts for a supply of power to the other component and at least one other contact, wherein the other contact loops through the contact of the communication interface of the connection or is a contact of another of the communication interfaces.

10. The oscillating conveyor according to claim 1, wherein the conveying apparatus is supported on the base by way of springs, wherein the control device is rigidly connected to the base.

11. The oscillating conveyor according to claim 1, wherein the drive device is formed by an electromagnet and a yoke, wherein the yoke is mounted on the conveying apparatus or is formed by said conveying apparatus and the electromagnet is mounted on a countermass supported so as to be able to oscillate with respect to the base, or vice versa.

12. The oscillating conveyor according to claim 1, wherein the control device comprises a near field communication interface and is designed to use the near field communication interface to provide data stored in the control device to an external mobile device and/or to receive configuration data from the mobile device, on which configuration data the further operation of the oscillating conveyor is dependent.

13. An apparatus comprising a first oscillating conveyor and a second oscillating conveyor, wherein the first and second oscillating conveyors are oscillating conveyors according to claim 1, wherein the control device of the second oscillating conveyor is the external communication device and uses the communication interface to communicate with the control device of the first oscillating conveyor.

14. The apparatus according to claim 13, wherein the communication connection of the first and second oscillating conveyors via their respective communication interfaces forms a section of a bus or of a network with linear topology or ring topology.

15. The apparatus according to claim 13, wherein the control device of the first oscillating conveyor is designed to ascertain control information for the second oscillating conveyor or another oscillating conveyor connected to the bus or the network and to use the communication interface to transmit a communication message that comprises said control information and is addressed to the second or the other oscillating conveyor.

* * * * *